Nov. 13, 1928.

W. P. OSGOOD 1,691,493

SEAM PRESSING MACHINE

Filed Dec. 30, 1927

Inventor.
Walter P. Osgood
by Heard Smith & Tennant.
Attys.

Patented Nov. 13, 1928.

1,691,493

UNITED STATES PATENT OFFICE.

WALTER P. OSGOOD, OF MALDEN, MASSACHUSETTS, ASSIGNOR TO BOSTON MACHINE WORKS COMPANY, OF LYNN, MASSACHUSETTS, A CORPORATION OF MASSACHUSETTS.

SEAM-PRESSING MACHINE.

REISSUED

Application filed December 30, 1927. Serial No. 246,733.

This invention relates to a combined taping and seam-pressing machine of the type shown in my Patent No. 1,646,212, October 18th, 1927. The device illustrated in said patent comprises a work support over which is fed work in the form of two pieces seamed together by a seam presenting a seam ridge, means to lay an adhesive tape over the seam ridge, and a seam-pressing member co-operating with the work support to press the seam and simultaneously to press adhesive tape against the flattened seam ridge.

The seam-pressing member in said patent is so constructed that as the work and the tape pass to the pressing member the latter will act first on the seam ridge to press or flatten the latter and simultaneously cause the adhesive tape to adhere thereto and will then act on the marginal portions of the tape either side of the seam ridge and cause such marginal portions to adhere to the work outside of the flattened ridge. This method of operation is secured by providing the active face of the pressing member with a groove at its heel or rear end which groove is of a size to receive the flattened tape so that as the work progresses beneath the pressing member the forward or entering end of the pressing member will engage the seam ridge but will not engage the work either side of the seam ridge while at the rearward or delivery end the seam will occupy the groove and the active face of the presser member either side of the groove will engage the marginal portions of the tape and press them against the work outside of the pressed seam ridge.

An object of my present invention is to provide an improved form of work support and presser by which the same general operations may be carried out. In the present embodiment the work support is provided with a groove of a size to receive the seam ridge after it has been pressed, and the presser is provided with two portions, one of which is relatively narrow and is arranged to act on the seam ridge and press or flatten the latter into the groove and at the same time to cause the adhesive tape to adhere to the seam ridge, and the other of which is relatively wide and is arranged to act on the portions of the tape on both sides of the seam ridge and press the latter against the work. These two portions of the presser have such a relative position that as the work is fed over the work support the relatively narrow portion of the presser acts on the work in advance of the relatively wide portion. Hence at any point along the seam the seam ridge will be pressed and the tape applied thereto before the portions of the tape on the sides of the seam are attached to the work.

In order to give an understanding of the invention I have illustrated in the drawings a selected embodiment thereof which will now be described after which the novel features will be pointed out in the appended claims.

Inasmuch as the present invention relates simply to the work support and the presser I have not thought it necessary to illustrate herein a complete machine, but have shown only the parts thereof with which the invention is concerned.

Figure 1:
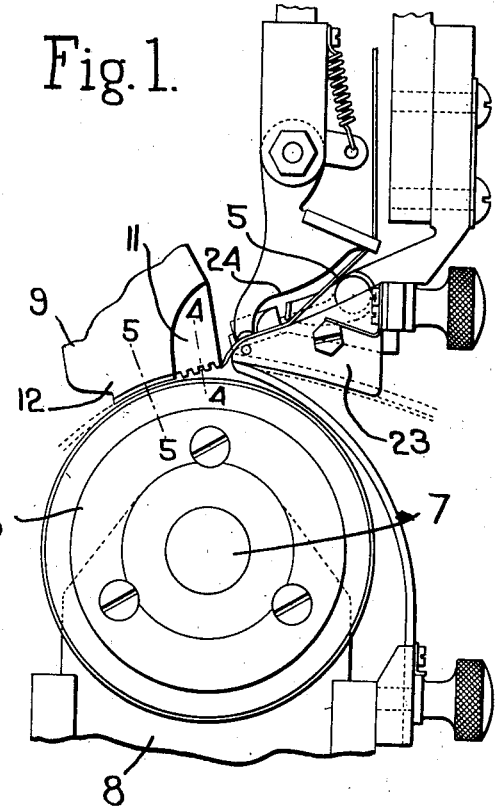
Fig. 1 is a fragmentary view of a combined seam-pressing and tape-applying means embodying my invention.
Figure 3:
Fig. 3 illustrates the same pieces after they are opened out to present the seam ridge.
Figure 2:
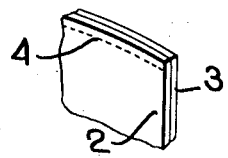
Fig. 2 is a fragmentary view showing two pieces seamed together;

The machine to which this invention is applied is designed to press a seam ridge 1 which is formed when two pieces 2 and 3 of leather or other sheet material are seamed together in face to face relation by stitches 4 adjacent the edges of the pieces and said pieces are afterwards opened out away from each other as shown in Fig. 3 and is also designed to apply an adhesive tape 5 to the pressed seam simultaneously with the pressing of the latter.

The pressing of the seam and applying the tape is accomplished through the co-operation of a work support and seam presser all as shown in my above-mentioned Patent No. 1,646,212 and also in my prior Patent No. 1,549,376, dated August 11, 1925. The work support is shown at 6 and it is in the form of a roll which is freely mounted on a shaft or stud 7 carried in a stand or support 8.

The presser is indicated at 9 and it has a combined oscillating and rocking motion, all as described in said patents which causes it to intermittently engage the work and feed it forward.

The work support 6 is formed with a peripheral groove 10 of a size to receive the flattened seam ridge.

In the construction illustrated the groove 10 is provided with a solid bottom and with yielding sides. This is provided for by forming the roll 6 with a metal ring 41 which forms the bottom of the groove and by incorporating in the roll two rings 42 of yielding material, such as rubber, which form both sides of the groove and the portion of the work supporting face either side of the groove.

As stated above the presser 9 is provided with two portions, one of which is relatively narrow and the other of which is considerably wider. The relatively narrow portion of the presser is that which acts on and presses the seam ridge and also causes the tape to adhere to the flattened or pressed seam ridge while the wider portion of the presser is that which acts on the tape on both sides of the seam ridge and completes the application of the tape to the work. These two portions of the presser may be integral with each other or may be separate elements movable relative to each other but in the preferred embodiment of the invention the narrow portion, whether integral with the wide portion or separate therefrom, acts on the seam ridge as the work is advanced across the work support and presses said ridge into the groove and also applies the tape to the ridge, the wider portion of the presser then acting on the work and pressing the tape thereagainst on both sides of the flattened seam. In the particular embodiment of the invention herein illustrated the two portions of the presser element are integral with each other both being formed as part of the presser element 9. The forward or relatively narrow portion is indicated at 11 and the wider portion which is at the rear of the presser is indicated at 12.

In the drawings 23 indicates a seam guide such as shown in my co-pending application Serial No. 239,293, filed December 12th, 1927 which co-operates with the seam ridge to guide the work to the work support and 24 indicates a tape-delivery means by which the adhesive tape 5 is delivered to the seam ridge just before the latter passes under the pressing element 9.

Figure 4:
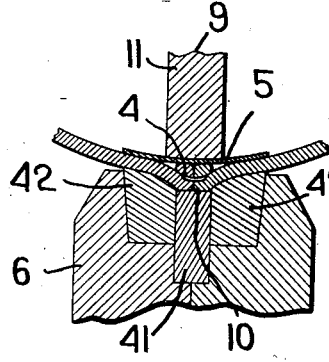
Fig. 4 is an enlarged section on the line 4—4, Fig. 1.

In the operation of the device as the work in the form shown in Fig. 3 is fed to the work support the tape will be laid over the seam ridge all as described in the above-mentioned patents. As the work with the tape thereon passes under the presser 9 the narrow forward portion 11 thereof acts on the seam ridge as shown in Fig. 4 and presses the latter, this pressing operation being done through the tape 5 which has been laid over the seam ridge. Since this portion 11 is relatively narrow the full pressure thereof will be applied to the seam-ridge zone of the work and said ridge will be pressed or flattened to the desired extent. During this operation the seam with the seam ridge is forced into the groove 10 as seen in Fig. 4 and the adhesive tape 5 is pressed against and caused to adhere to the flattened seam ridge. When the work passes from under the narrow portion 11 of the presser to a position under the wider rear portion 12 the marginal portions 13 of said wider end 12 will engage the tape on either side of the pressed seam ridge and will press such portions of the tape against the work, thus completing the application of the tape to the work.

During the pressing of the seam ridge by the narrow portion 11 of the presser said ridge will be forced against the metal ring 41 which is unyielding and will be crowded into the groove 10, the sides of which are somewhat yielding, and during this operation the work either side of the flattened seam ridge is supported by the yielding rings 42. When the work passes underneath the wider part 12 of the presser the portions 13 of the face thereof act on the portions 14 of the tape either side of the pressed seam and coact with the yielding rings 42 to complete the pressing of the tape against the work as shown in Fig. 5.

The groove 10 is of sufficient depth so that as the work passes beneath the portion 12 of the presser there will be relatively little pressure, if any, on the flattened seam ridge and the pressing force of the presser will come on the marginal portions 14 of the tape and on the portions of the work therebeneath which are supported by the yielding rings 42 of the work support 6. With this arrangement, therefore, the seam will be progressively pressed and the tape will also be progressively acted on both longitudinally and transversely thereof.

Figure 5:
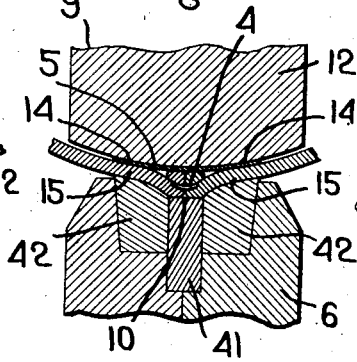
Fig. 5 is an enlarged section on the line 5—5, Fig. 1.
Figure 6:
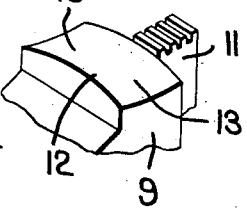
Fig. 6 is a fragmentary perspective view of the active face of the presser.
Figure 7:
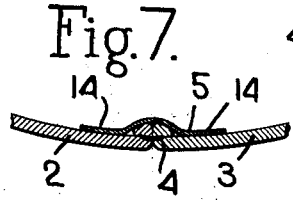
Fig. 7 is a sectional view through the work showing the pressed seam with the tape applied thereto.
Figure 8:
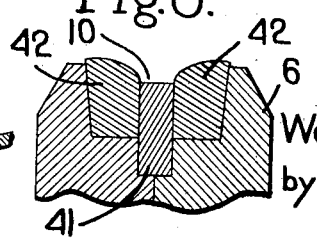
Fig. 8 is a fragmentary sectional view of the work support.

The forcing of the work into the groove 10 during the pressing of the seam ridge as shown in Fig. 5 gives the face of the work which is opposite the seam ridge, and which is usually the outer face of the work when the latter is incorporated in a finished article, a convex shape as will be readily seen from Figs. 4 and 5, while the face of the work on which the tape 5 is laid is given a concave curvature. When, therefore, the work comes out of the machine the tape will tend to hold the work in the general shape shown in Fig. 7. This is advantageous in some kinds of work, especially in treating the pieces of leather which are sewed together to form the heel portion of a shoe since when these pieces are incorporated in the shoe the outer face of the work which is opposite the seam ridge is on the outside of the heel and will naturally have a convex curvature.

While I have illustrated herein a selected embodiment of my invention I do not wish to be limited to the constructional features shown.

I claim:

1. In a seam-pressing and tape-applying machine, the combination with a work support over which is fed work in the form of two pieces seamed together by a seam presenting a seam ridge, said work support having a groove of a size to receive the seam ridge after it is pressed or flattened, of means for laying an adhesive tape over the seam ridge as the work is fed to the machine, and an intermittently acting presser co-operating with the work support to press the seam ridge and apply the tape thereto, said presser having the portion thereof with which the seam ridge first contacts relatively narrow so that it will engage the seam ridge and press the latter into the groove, the rear portion of said presser being wider than said groove and so disposed relative to the relatively narrow portion that as the work passes under said rear portion the latter will engage the portions of the tape outside the flattened seam and press said portions of the tape against the portions of the work supported either side of the groove.

2. In a seam-pressing machine, the combination with a work support over which is fed two pieces seamed together by a seam presenting a seam ridge, said work support having a groove of a size to receive the pressed seam ridge, of means to lay an adhesive tape over the seam ridge, and means operating as the work is fed over the work support to apply pressure first to the seam ridge and the tape overlying it thereby to press the seam and force it into the groove of the work support, and thereafter to apply pressure to the marginal portions of the tape and the work which is supported either side of the groove in the work support.

In testimony whereof, I have signed my name to this specification.

WALTER P. OSGOOD.